United States Patent [19]

Kobayashi et al.

[11] Patent Number: 5,523,341

[45] Date of Patent: *Jun. 4, 1996

[54] POLYOXYMETHYLENE RESIN COMPOSITIONS HAVING IMPROVED WEATHERABILITY

[75] Inventors: Toshikazu Kobayashi; Ken-ichi Shinohara, both of Yokohama, Japan

[73] Assignee: E. I. Du Pont de Nemours and Company, Wilmington, Del.

[*] Notice: The term of this patent shall not extend beyond the expiration date of Pat. No. 5,418,286.

[21] Appl. No.: 484,370

[22] Filed: Jun. 7, 1995

Related U.S. Application Data

[63] Continuation of Ser. No. 193,063, filed as PCT/US92/07398 Sep. 9, 1992, published as WO93/05107 Mar, 1993, abandoned.

[30] Foreign Application Priority Data

Sep. 12, 1991 [JP] Japan .................................. 3-233038

[51] Int. Cl.$^6$ ........................... C08L 39/04; C08L 61/02; C08K 5/34
[52] U.S. Cl. .............. 524/99; 525/64; 525/154; 524/102; 524/504; 524/512; 524/91
[58] Field of Search ............... 525/64, 154; 524/91, 524/102, 504, 512, 99

[56] References Cited

U.S. PATENT DOCUMENTS

| | | | |
|---|---|---|---|
| 3,960,984 | 6/1976 | Kohan | 260/857 |
| 5,036,120 | 6/1991 | Orikasa | 525/64 |
| 5,086,095 | 2/1992 | Katsumata | 524/91 |
| 5,208,279 | 5/1993 | Katsumata | 524/91 |
| 5,418,286 | 5/1995 | Takahashi | 525/64 |

FOREIGN PATENT DOCUMENTS

| | | | |
|---|---|---|---|
| 59-064654A | 4/1984 | Japan . | |
| 64654 | 4/1984 | Japan | 525/154 |
| WO92/20745 | 11/1992 | WIPO . | |

*Primary Examiner*—Melvyn I. Marquis

[57] ABSTRACT

The present invention is aimed at improving the weathering resistance of a polyoxymethylene resin without adversely affecting its excellent mechanical properties. The invention comprises incorporating into polyoxymethylene a UV absorber and/or a light stabilizer, along with a grafted copolymer containing epoxy-containing olefinic monomer units and/or a polymer containing oxazolyl groups.

5 Claims, No Drawings

POLYOXYMETHYLENE RESIN COMPOSITIONS HAVING IMPROVED WEATHERABILITY

This is a continuation, of application Ser. No. 08/193,063 filed as PCT/US92/07398 Sep. 9, 1992, published as WO93/05107 Mar. 18, 1993, now abandoned.

BACKGROUND

The present invention relates to polyoxymethylene (also referred to herein as polyacetal) resin compositions having improved weatherability.

Polyacetal resin is manufactured by polymerizing a mostly formaldehyde monomer or a formaldehyde trimer (trioxane). Acetal homopolymer is a homopolymer of formaldehyde (for example, Delrin®, manufactured by the Du Pont Company). Acetal copolymer is obtained by copolymerizing ethylene oxide with formaldehyde (for example, Duracon®, manufactured by the Celanese Company). Polyacetal is well known in the art.

Polyoxymethylene resin, because of its high mechanical strength, excellent abrasion resistance, fatigue resistance, moldability, and the like, is extensively used, for example, in electrical and electronic applications, automotive applications, and precision machine applications.

However, conventional polyoxymethylene resin is deficient in that it may not exhibit Sufficient weathering resistance, for example, when it is exposed to sunlight for a long period of time. This deficiency in weathering resistance occurs because the main chains near the surface of the polyoxymethylene can be cleaved by light energy, thereby resulting in a phenomenon called "chalking". "Chalking" results in the generation of a fine white powder on the surface of molded polyoxymethylene articles. This "chalking" adversely affects the appearance, as well as the mechanical strength, of the molded article. As such, it is desirous to enhance the weathering resistance of polyoxymethylene compositions, especially when the end product is targeted for automotive exterior and interior applications.

Past attempts to improve upon the weatherability of polyoxymethylene compositions have included, for example, use of a benzophenone or benzotriazole type UV absorber, incorporating such a UV absorber together with a hindered amine type light stabilizer, and plating or painting the surface of a polyoxymethylene molded article. However, it has been found that incorporation of small amounts of a UV absorber or light stabilizer into the polyoxymethylene yields unsatisfactory improvements in the weatherability of the polyoxymethylene, while incorporation of large amounts of a UV absorber or light stabilizer deteriorates the heat stability, appearance, and mechanical strength of the polyoxymethylene. Additives, such as certain UV absorbers or light stabilizers, if not sufficiently compatible with the polyoxymethylene, gradually bleed to the surface of the polyoxymethylene in a process called blooming, which results in a less desirous composition.

Plating or painting a polyoxymethylene surface is inevitably disadvantageous in terms of operability and manufacturing costs in that additional technology is needed to improve the wettability of the polyoxymethylene surface.

The prior art methods for improving weatherability involve blending a better weathering general-purpose polymer, such as a polymethacrylate ester, into polyoxymethylene (Japanese Patent Application Publication Kokai 1-138258, Kokai 2-294352, and Kokai 2-180951). However, the resultant compositions tend to suffer from difficulties in maintaining the dispersion of the polymethyl methacrylate ester in a stable and uniform manner. Such difficulties can cause nonuniform surface degradation of a polyoxymethylene molded article, said surface degradation depending upon the shape of the molded article subjected to the weathering test, and the like.

Thus, the present invention is aimed at providing a polyoxymethylene composition which exhibits excellent weatherability without significantly adversely affecting the inherent properties (such as mechanical properties, abrasion-wear characteristics, fatigue characteristics, and moldability) of the polyoxymethylene. It is further aimed at providing a polyoxymethylene composition having uniform weatherability which can be used in interior and exterior pans without any plating or painting treatment thereof.

The above objectives were met by incorporating into a polyoxymethylene resin a UV absorber and/or hindered amine light stabilizer together with a graft copolymer containing epoxy-containing olefinic monomer units and/or a polymer containing oxazolyl groups.

DETAILED DESCRIPTION OF THE INVENTION

The present invention relates to a polyoxymethylene composition consisting essentially of (a) a polyoxymethylene, (b) a polymer selected from (b)(1) graft copolymers containing epoxy-containing olefin monomer units, (b)(2) a polymer containing oxazolyl groups, and (b)(3) mixtures of (b)(1) and (b)(2), and (c) a UV absorber and/or hindered amine light stabilizer.

The component (a) polyoxymethylene resin used in the composition of this invention is a polymer mainly composed of oxymethylene (—$CH_2O$—) structural units. It may be an oxymethylene homopolymer or copolymer, terpolymer, or block copolymer containing small amounts of structural units other than oxymethylene groups. It can be a linear, branched, or crosslinked molecular structure. The polyoxymethylene resin to which this invention is applicable generally has a number average molecular weight of 10,000–100,000, preferably 20,000–90,000, more preferably 25,000–70,000.

The component (b) polymer used in the compositions of the present invention is selected from (b)(1) a graft copolymer containing epoxy-containing olefinic monomer units, (b)(2) a polymer containing oxazolyl groups, and (b)(3) mixtures thereof.

The component (b)(1) graft copolymer containing epoxy-containing olefinic monomer units used in this invention are preferably epoxy-containing olefinic copolymers grafted with vinyl polymers.

Specific examples of the epoxy-containing olefinic copolymers include ethylene-glycidyl acrylate ("EGA") copolymers, ethylene-glycidyl methacrylate ("EGMA") copolymers, propylene-glycidyl methacrylate ("PGMA") copolymers, and the like. The glycidyl methacrylate ("GM") or glycidyl acrylate ("GA") content in these copolymers is preferably 1–40 weight percent, most preferably 10–30 weight percent.

Vinyl polymers graft-polymerized onto the above epoxy-containing olefinic copolymers include polymethyl methacrylate, polyethyl acrylate, polybutyl acrylate, polyacrylonitrile, polystyrene, acrylonitrilestyrene copolymer, butyl acrylate-methyl methacrylate copolymers, and the like.

From among the graft copolymers comprising the above components, it is particularly preferred to use an ethyleneglycidyl methacrylate copolymer, graft polymerized with polymethyl methacrylate.

In the component (b)(1) graft copolymer of the present invention, the preferred ratio of the epoxy-containing olefinic copolymer units to the vinyl polymer units is about 80/20% by weight–40/60% by weight. The melt index (JIS K7210) of the graft copolymer is preferably about 0.1–20, more particularly about 0.5–10. The graft copolymer can be prepared by techniques readily available to those skilled in the art.

The component (b)(2) polymers containing oxazolyl groups used in the present invention are vinyl polymers containing oxazolyl-containing olefinic monomer units, such as 2-vinyl-2-oxazoline-styrene copolymers, 2-vinyl-2-oxazoline-methyl methacrylate copolymers, 2-vinyl-2-oxazoline-acrylonitrile-styrene copolymers, and the like. The content of the oxazolyl-containing olefinic monomer units in these copolymers is preferably about 0.1–30%, more particularly about 5–20%. The molecular weight of these copolymers in terms of a number average molecular weight is preferably about 30,000–200,000, more particularly about 50,000–100,000.

The composition of this invention permits using either graft copolymers containing epoxy-containing olefinic monomer units or polymers containing oxazolyl groups or both.

The component (c) UV absorbers and hindered amine light stabilizers used in the compositions of this invention are described below.

The UV absorbers which can be used include benzotriazole, benzophenone, aromatic benzoate, cyano acrylate, and oxalic acid anilide types, and the like.

Such UV absorbers include, for example, 2-(2'-hydroxy-5'-methylphenyl)-benzotriazole, 2-(2'-hydroxy-3',5'-di-t-butylphenyl)benzotriazole, 2-(2'-hydroxy-3',5'-di-isoamylphenyl)benzotriazole, 2-(2'-hydroxy-3',5'-bis(alpha, alpha-dimenthylbenzyl)phenyl)benzotriazole, 2-(2'-hydroxy-4'-octoxyphenyl)benzotriazole, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-hydroxy-4-oxybenzylbenzophenone, p-t-butylphenyl salicylate, p-octylphenyl salicylate, 2-ethylhexyl-2-cyano-3,3'-diphenylacrylate, ethyl-2-cyano-3,3'-diphenylacrylate, N-(2-ethylphenyl)-N'-(2-ethoxy-5-t-butylphenoxy)oxali acid diamide, N-(2-ethylphenyl)-N'-(2-ethoxyphenyl)oxalic acid diamide, and the like. From among these UV absorbers, a benzotriazole type is particularly preferred.

The preferred amount of the UV absorber added per 100 parts by weight of the polyoxymethylene resin is in the range 0.1–10 parts by weight, more particularly from 0.15–1.5 parts by weight.

The hindered amine light stabilizers used in this invention are preferably hindered amine type light stabilizers, such as 4-acetoxy-2,2,6,6-tetramethylpiperidine, 4-stearoyloxy-2,2,6,6-tetramethylpiperidine, 4-acryloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperdine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethylpiperidyl)sebacate, bis(2,2,6,6-tetramethyl-4-piperidyl)terephthalate, 1,2-bis(2,2,6,6-tetramethyl-4-piperidyloxy)ethane, 1,2-bis(2,2,2,6-tetramethyl-4-Piperidyl)hexamethylene-1,6-dicarbamate, bis(1-methyl-2,2,6,6-tetramethyl-4-piperidyl)adipate, tris(2,2,6,6-tetramethyl4-piperidyl)benzene-1,3,5-tricarboxylate, and the like.

The preferred amount of the light stabilizer added per 100 parts by weight of polyoxymethylene resin is in the range of 0.1–10 parts by weight, preferably from 0.15–1.5 parts by weight.

The UV absorber and hindered amine light stabilizer may be added singly or in a mixture of two ore more, preferably using both a UV absorber and a hindered amine light stabilizer for synergistically improved weathering resistance.

The general amounts of the components in the polyoxymethylene resin composition of the present invention are as follows: 0.1–30% by weight of the component (b) polymer and 0.01–5% by weight of the component (c) absorber/stabilizer, with said weight percent being based upon 100 parts by weight of the component (a) polyoxymethylene. However, it is noted that the amount of the component (b) graft copolymer or oxazolyl-group polymer may be outside of the range given above, depending upon the number of moles of epoxy or oxazolyl groups per unit weight of said component (b) graft copolymer or oxazolyl-containing polymer, respectively.

The polyoxymethylene resin compositions of this invention, depending upon the applications and objectives for providing needed properties, may incorporate, within the range of not adversely affecting the objective of this invention, known additives such as heat stabilizers, lubricants, nucleating agents, mold release agents, antistatic agents, surface active agents, inorganic fillers, and a variety of dyes and pigments.

The polyoxymethylene resin compositions of this invention can be readily prepared by processes known in the art, such as, for example, thoroughly and uniformly mixing the components, followed by further mixing and extruding from a single screw or twin screw extruder to generate pellets.

Molded articles from the composition of this invention can be prepared by subjecting the resultant compositions as above to conventional molding methods, such as, for example, injection molding, extrusion, compression molding, and the like.

The polyoxymethylene resin compositions of this invention can be favorably used in molded articles in every area which requires weathering resistance, especially as in automotive interior and exterior parts, electrical appliances, office machines, and the like. Since the compositions are excellent in weathering resistance, shaped articles which heretofore required a surface treatment such as painting or plating or the like, no longer require any surface treatment.

EXAMPLES

The present invention is further described by the following Examples and Control Examples, but the scope of this invention is not limited to these Examples.

Test Methods

The methods of evaluating weatherability, measuring mechanical properties, and evaluating heat stability used in the Examples and Control Examples are described below.

Evaluation of Weatherability

A test piece (75 cm×125 cm×8 mm) was tested in a Sunshine weatherometer (Suga Shikenki Company) by exposing it to carbon arc light for 1,000 hours under conditions of a black panel temperature of 83° C. and distilled water spray/drying cycles (18 minute/112 minute cycles), so as to permit observing the way chalking and crazing occurred and to measure any change in the color phase after 1,000 hours.

Color differential (dE) was measured a Hunter-Lab Calorimeter (D25M/D25-9) by method JISZ8729.

Measurement of Mechanical Properties

Test pieces were tested for mechanical properties according to the following methods: ASTM-0638 for tensile strength and elongation at the break, ASTM-0790 for flexural modulus, and ASTM-0256 for notched Izod impact values.

Evaluation of Heat Stability

A 2 g pellet sample was placed in a heat resistant glass tube and heated for 30 minutes at 250° C. under a nitrogen blanket. The loss of weight resulting from the decomposition of the polyoxymethylene was measured and the ratio (T), described below, was reported as percent by weight. T was used as a measure for the heat stability of a polyoxymethylene resin composition.

$T=100\times(W_1-W_2)/W_1$ $W_1$=Original Weight (g)

$W_2$=Weight After Heat Treatment (g)

Components

The following components were used in the Examples and Control Examples:

Polyoxymethylene (a): an oxymethylene homopolymer having a melt index of 6.2 g/10 minutes and containing 0.3 weight percent antioxidant, 0.5 weight percent thermal stabilizer, and 0.5 weight percent lubricant;

Carbon black: a melt mix of 33 parts by weight of carbon black and 67 parts by weight of polyethylene;

Polymer Additives:

X1: An ethylene-glycidyl methacrylate copolymer (EGMA) grafted with acrylonitrile-styrene copolymer (AS) (glycidyl methacrylate content 10.5%, EGMA/AS=70/30, Nippon Yushi K. K.; tradename: "Modeipar 4400");

X2: An ethylene-glycidyl methacrylate copolymer (EGMA) grafted with polymethyl methacrylate (PMMA) (glycidyl methacrylate content 10.5%, EGMA/PMMA=70/30, Nippon Yushi K. K.; tradename: "Modeipar 4200");

X3: A styrene-glycidyl methacrylate copolymer grafted with an acrylonitrile-styrene copolymer;

X4: A 2-vinyl-2-oxazoline-methyl methacrylate copolymer (2-vinyl2-oxazoline content 5%; Nippon Shokubai K. K.; tradename: "RPM1005");

X5: A 2-vinyl-2-oxazoline-acrylonitrile-styrene copolymer (2-vinyl-2-oxazoline content 5%, Nippon Shokubai K. K.; tradename: "RAS1005");

Y1: An acrylonitrile-styrene copolymer (Mitsui Toatsu Kagaku; tradename: "Nartak 120P");

Y2: A polymethyl methacrylate (Du Pont Company; tradename: "Elvacite 2013");

Y3: A polymethyl methacrylate (Du Pont Company; tradename: "Elvacite 2016");

Y4: A linear low density polyethylene (LLDPE) grafted with polymethyl methacrylate (PMMA) (LLDPE/PMMA=70/30; Nippon Yushi K. K.; tradename: "Modeipar 1200");

Y5: An ethylene-vinyl acetate copolymer (EVAc) grafted with an acrylonitrile-styrene copolymer (AS) (EVAc/AS=70/30; Nippon Yushi K. K.; tradename: "Modeipar A6400").

Example 1

A mixture of 11.85 kg of polyoxymethylene homopolymer (a), 36 g of a UV absorber (Ciba Geigy Company, tradename "Tinuvin 234"), 36 g of a light stabilizer (Ciba Geigy Company, tradename "Tinuvin 622"), 72 g of carbon black, and 600 g of polymer additive X1 was mixed in a Henshel mixer and melt mixed in a 35 mm twin screw extruder to give a polyoxymethylene resin composition in pellet form. Dumbbell test pieces and slabs were molded from these pellets by an injection molding machine for use in evaluating the weathering resistance and other properties. Table 1 lists the results of the evaluation of weathering resistance. Table 2 lists the mechanical properties and heat stability.

The composition of Example 1 showed no crazing on the surface after 1,000 hour exposure to a carbon arc irradiation. It was only after about 800 hours of irradiation when chalking in which the surface became whitened was significantly visible. Heat stability was also good and mechanical properties were only slightly lower than for a polyoxymethylene homopolymer.

Example 2

Example 1 was repeated except for replacing the polymer additive X1 used in Example 1 with X2 to prepare a polyoxymethylene resin composition from which test pieces were prepared in a manner similar to that of Example 1 for evaluating the weathering resistance and other properties. Table 1 lists the results of the evaluation of weathering resistance. Table 2 lists the mechanical properties and heat stability.

There was no surface crazing or chalking after a 1,000-hour exposure to a carbon arc irradiation, with further improvement in weatherability compared to Example 1. The color differential was only 1.8 even after 1,000 hours of irradiation with essentially no change in color. The properties of polyoxymethylene were satisfactorily maintained as in the case of Example 1 for mechanical properties and heat stability.

Examples 3–5

Example 2 was repeated except for replacing the polymer additive X2 with polymer additives X3, X4, and X5 to prepare polyoxymethylene resin compositions which were used to measure weathering resistance, mechanical properties, and heat stability, as in the case of Example 2. These data are shown in Tables 1 and 2. All the compositions showed excellent weathering resistance and exhibited good mechanical properties and heat stability.

Control Example 1

Example 1 was repeated to prepare a polyoxymethylene resin composition except for not adding any of the polymer additives, UV absorbers, or light stabilizers. The test pieces from this composition were used to evaluate weathering resistance and other properties, as in the case of Examples 1–5. Table 3 lists the results of measuring the weathering resistance; Table 4 shows the mechanical properties and heat stability.

The composition of Control Example 1 containing no UV absorber, light stabilizer, or polymer additive showed considerably inferior weathering resistance, giving crazing and chalking on the surface within one short hour of carbon arc irradiation.

Control Example 2

A polyoxymethylene resin composition was prepared by adding to the composition of Control Example 1, 36 g of a UV absorber (Ciba Geigy Company, tradename, "Tinuvin 234") and 36 g of a light stabilizer (Ciba Geigy Company, tradename, "Tinuvin 622"). Test pieces were obtained from the composition in a manner similar to that of Example 1 to evaluate weathering resistance and other properties. Table 3 lists the results of evaluating weathering resistance; and Table 4 shows the mechanical properties and heat stability. Weatherability substantially improved compared to Control Example 1, but there was significant discoloration after 1,000 hours of long-term irradiation.

Control Examples 3–7

Polyoxymethylene resin composition were prepared by adding 600 g each of the polymer additives, Y1, Y2, and Y3, respectively, to the composition of Control Example 1. The test pieces prepared from these compositions in a manner similar to that of Example 1 were tested for weathering resistance and other properties. Table 3 lists the results of evaluating the weathering resistance; Table 4 shows the mechanical properties and heat stability.

Adding an acrylonitrile-styrene copolymer (Control Example 3) was effective for suppressing chalking or craze-formation at the initial period of irradiation, but there was substantial whitening after 1,000 hours of irradiation.

Incorporation of polymethyl methacrylate as a polymer additive (Control Examples 4 and 5) exhibited substantial improvement in weathering resistance, slowing the time for chalking or craze formation, but these compositions were deficient in that the way chalking occurred was nonuniform on the test piece surfaces and the composition exhibited a rather substantial decreased in heat stability.

TABLE 1

| Example No. | Polyoxy-methylene | Polymer Additive | UV Absorber | Light Stabilizer | Chalking (hr) | Craze Formation | Color Differential (dE) |
|---|---|---|---|---|---|---|---|
| 1 | (a) | X1 | Tinuvin ® 234 | Tinuvin ® 622 | >800 | None | 8.9 |
| 2 | (a) | X2 | Tinuvin ® 234 | Tinuvin ® 622 | >1000 | None | 1.8 |
| 3 | (a) | X3 | Tinuvin ® 234 | Tinuvin ® 622 | >800 | None | 9.7 |
| 4 | (a) | X4 | Tinuvin ® 234 | Tinuvin ® 622 | >1000 | None | 5.4 |
| 5 | (a) | X5 | Tinuvin ® 234 | Tinuvin ® 622 | >1000 | None | 3.6 |

TABLE 2

| Example No. | Heat Stability | Tensile Strength (kg/cm$^2$) | Elongation at the Break (%) | Flexural Modulus (kg/cm) | Izod Impact Value (kg · cm/cm) |
|---|---|---|---|---|---|
| 1 | 0.19 | 672 | 22.5 | 27,300 | 4.8 |
| 2 | 0.56 | 670 | 27.1 | 27,300 | 4.9 |
| 3 | 0.58 | 701 | 16.8 | 21,200 | 4.6 |
| 4 | 0.64 | 693 | 24.5 | 30,100 | 5.1 |
| 5 | 0.22 | 688 | 21.3 | 29,800 | 5.8 |

TABLE 3

| Control Example No. | Polyoxy-methylene | Polymer Additive | UV Absorber | Light Stabilizer | Chalking (hr) | Craze Formation (hr) | Color Differential (dE) |
|---|---|---|---|---|---|---|---|
| C1 | (a) | None | None | None | 200 | 350 | 33.9 |
| C2 | (a) | None | Tinuvin ® 234 | Tinuvin ® 622 | 400 | 800 | 11.5 |
| C3 | (a) | Y1 | Tinuvin ® 234 | Tinuvin ® 622 | 500 | 800 | 28.6 |
| C4 | (a) | Y2 | Tinuvin ® 234 | Tinuvin ® 622 | 700 | None | 15.5 |
| C5 | (a) | Y3 | Tinuvin ® 234 | Tinuvin ® 622 | 400 | None | 30.0 |
| C6 | (a) | Y4 | Tinuvin ® 234 | Tinuvin ® 622 | 500 | 800 | 29.5 |
| C7 | (a) | Y5 | Tinuvin ® 234 | Tinuvin ® 622 | 400 | 600 | 26.4 |

TABLE 4

| Control Example No. | Heat Stability | Tensile Strength (kg/cm$^2$) | Elongation at the Break (%) | Flexural Modulus (kg/cm) | Izod Impact Value (kg · cm/cm) |
|---|---|---|---|---|---|
| C1 | 0.08 | 698 | 35.0 | 28,300 | 5.6 |
| C2 | 0.12 | 712 | 37.5 | 31,200 | 6.2 |
| C3 | 0.17 | 655 | 13.9 | 31,300 | 5.8 |
| C4 | 1.90 | 685 | 33.5 | 29,400 | 5.6 |
| C5 | 1.51 | 664 | 37.8 | 28,600 | 5.2 |
| C6 | 1.26 | 646 | 32.8 | 28,300 | 6.2 |
| C7 | 1.68 | 648 | 34.6 | 29,200 | 6.0 |

We claim:

1. A composition consisting essentially of
   (a) a polyoxymethylene,
   (b) 0.1–30 weight percent of a vinyl polymer containing oxazolyl-containing olefinic monomer units, and
   (c) 0.01–5 weight percent of at least one compound selected from the group consisting of UV absorbers, hindered amine light stabilizers, and mixtures thereof, with the weight percent ranges being based upon 100 parts by weight of the polyoxymethylene.

2. The composition of claim 1 wherein the component (a) polyoxymethylene is a homopolymer.

3. The composition of claim 1 wherein the component (a) polyoxymethylene is a copolymer.

4. The composition of claim 1 wherein the component (b) is selected from the group consisting of 2-vinyl-2-oxazoline-styrene copolymers, 2-vinyl-2-oxazoline-methyl methacrylate copolymers, and 2-vinyl-2-oxazoline-acrylonitrile-styrene copolymers.

5. The composition of claim 1 further consisting essentially of at least one of heat stabilizers, lubricants, nucleating agents, mold release agents, antistatic agents, surface active agents, inorganic fillers, dyes, or pigments.

* * * * *